MURRAY C. GODDARD
ROBERT W. HUBOI
INVENTORS

ATTORNEYS

Feb. 11, 1964  M. C. GODDARD ETAL  3,120,782
EXPOSURE CONTROL SYSTEM FOR COLOR PRINTERS
Filed March 27, 1961  2 Sheets-Sheet 2

MURRAY C. GODDARD
ROBERT W. HUBOI
INVENTORS

BY R. Frank Smith

Robert F. Crocker

ATTORNEYS

United States Patent Office 3,120,782
Patented Feb. 11, 1964

3,120,782
EXPOSURE CONTROL SYSTEM FOR COLOR
PRINTERS
Murray C. Goddard and Robert W. Huboi, Rochester, N.Y., assignors to Eastman Kodak Company, Rochester, N.Y., a corporation of New Jersey
Filed Mar. 27, 1961, Ser. No. 98,461
13 Claims. (Cl. 88—24)

This invention relates to an exposure control system for photographic color printers and particularly relates to such a system wherein the exposure for each of three primary color components may be accurately and independently controlled.

In the control of photographic printers used for printing color photographs it is well recognized in the art that there are many variable factors which will affect the faithfulness of the colors in the final print. Many systems have been proposed attempting to properly correlate these various factors, but such systems as have heretofore been known have involved extremely complicated apparatus. Even with such complicated apparatus the results have fallen far below that desired.

It is an object of this invention to provide an exposure control system for such color printers which, in the case of color negatives in the "normal" range, will automatically produce high quality prints, and which, at the same time, provides means for manually modifying the normal operation to compensate for substandard negatives such as under- or over-exposed negatives or negatives in which the color balance departs widely from normal values.

It is a further object of this invention to provide such a control system which utilizes relatively simple and readily available components and which is easily adapted to use with known color printers.

Figure 1:
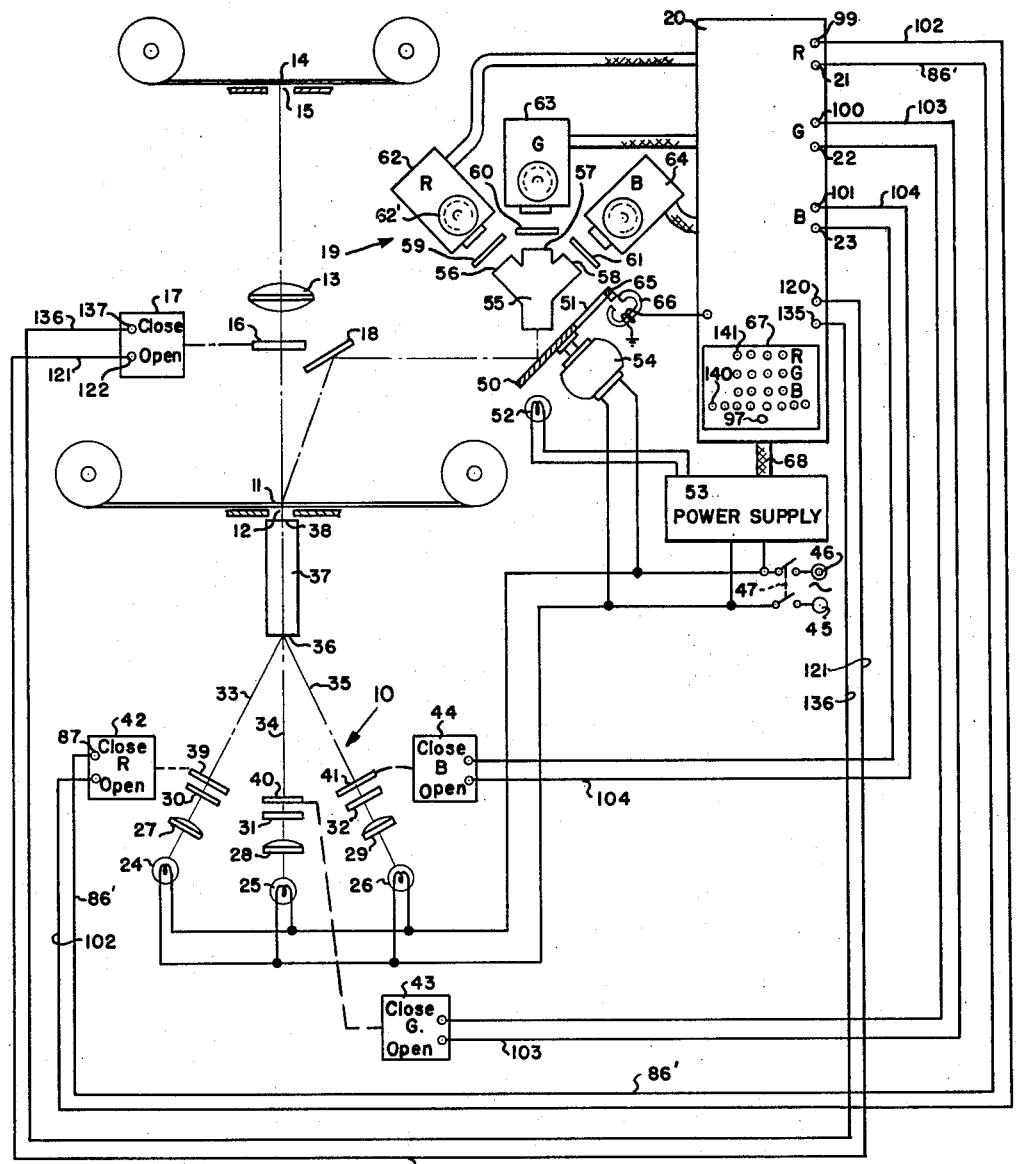
Figure 2:
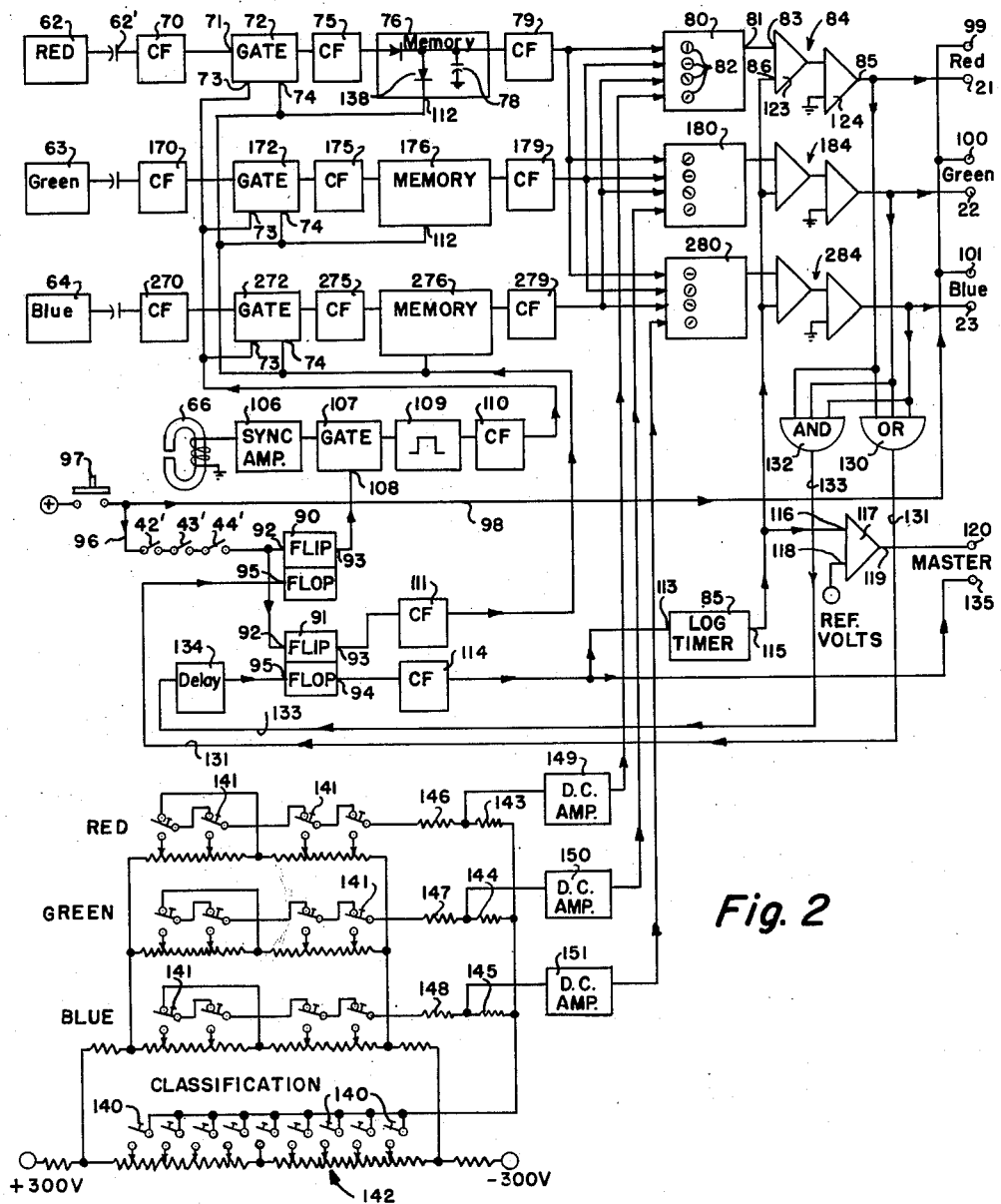

Further objects and advantages will become apparent from the following description and claims, particularly when considered in the light of the accompanying drawing, wherein:

FIGURE 1 is a somewhat diagrammatic view of a color printer with our improved exposure control system applied thereto; and FIGURE 2 is a diagram of the exposure control circuitry, partly in block diagram form and partly in schematic form.

As shown in FIGURE 1, our improved exposure control system is particularly intended for use in conjunction with a conventional type of color printer. Such a printer is shown somewhat diagrammatically as comprising a light source 10 which illuminates a negative 11 to be printed and which is positioned at a negative station 12, the light from the source 10 being essentially white light which is constituted by the three major primary color components, red, green and blue. An image of the illuminated negative is projected by a suitable lens system 13 onto a sensitized strip 14 located at the printing station 15. Passage of light to the printing station is controlled by a master shutter 16 movable between closed and open positions by a suitable actuator 17.

Some of the light from the negative 11 is directed, as by a mirror 18, into a color densitometer 19 which produces three density output signals, one corresponding to each of the three above-mentioned color components and indicative of the overall density of the negative for that particular color component. The density information is then fed into a computer and control unit 20 where, as will be further described in detail, the density information is utilized to determine the proper exposure time for each of the three color components. At the termination of the desired exposure period for each color an output signal appears at the corresponding output terminal 21, 22 or 23 to terminate the exposure of the sensitized strip 14 for that particular color component.

The light source 10 may be of any known type. However, we have shown, for purposes of illustration a source which includes three separate lamps 24, 25 and 26, each provided with an individual condenser lens 27, 28, 29 and appropriate color filters 30, 31, 32, respectively corresponding to the three primary colors red, green and blue. The three color components passing through these filters are then directed as indicated at 33, 34, 35 onto one end face 36 of a light integrating bar 37. As is well known to those in the art, the three color components will be effectively mixed together in the integrating bar 37 so that the resultant light emerging at the output face 38 thereof is a "white" light. The individual color components are separately controllable by means of movable shutters 39, 40, 41, each adapted to be moved between its closed and open positions by suitable actuators 42, 43, 44. The three lamps 24, 25, 26 may be directly energized from a conventional supply of alternating current connected to terminals 45, 46 and controlled by a suitable switch 47.

The color densitometer utilized may likewise be of any known conventional type. However, it is desirable, in order to insure the truest possible color reproduction, that the densitometer be capable of very precisely measuring the individual color densities. The densitometer shown in the drawing is particularly well adapted for this purpose and is the subject matter of a companion application Serial No. 98,398, filed March 27, 1961, by J. Reesen. The following brief description of this densitometer is believed sufficient for an understanding of its operation in the overall system shown and claimed herein but reference to said copending application should be made if further details are desired.

As shown in the drawing, light reflected by mirror 18 from the negative 11 is directed onto a rotating chopper disc 50, substantially half of the surface of which constitutes a reflecting surface, while the remainder is apertured as at 51. Adjacent the chopper disc 50 is a reference lamp 52 which s energized from a suitable source of regulated D.C. provided by a main power supply 53. Disc 50 is rotated at a steady rate by a suitable motor 54. An integrating bar 55, having three output faces 56, 57, 58, is so positioned that, as the disc 50 is rotated, the light reaching the integrating bar 55 alternately comes from the negative 11 and then from the reference lamp 52. Appropriate color filters 59, 60, 61 are positioned adjacent the output faces of integrating bar 55 so that the light emerging therefrom will be again separated into its three primary color components. The intensity of each of these components is sensed by the three photoelectric sensing units 62, 63, 64, the circuitry incorporated in each of these sensing units being such that, when the light reaching the integrating bar 55 is that derived from the negative an output signal will be produced thereby corresponding to the large area transmssion color density which we call hereafter the overall or integrated color density of the negative for that particular color component. During the alternate intervals when the light reaching bar 55 is derived from reference source 52, the output from the sensing unit will be of a value representing a standard or reference density. While there are many known sensing units which will thus effectively convert light intensity into density information, the sensing units may conveniently comprise a multiplier phototube, as diagrammatically indicated at 62', connected in a logging type inverse feedback circuit as taught by Gunderson Patent 2,413,706.

As will hereafter be clear, proper operation of the computer and control unit 20 requires a gating or switching action in timed synchronism with the operation of the chopper disc 50. To obtain such synchronous operation the disc 50 may conveniently be provided with a magnetic element 65 positioned so as to sweep past a sensing element 66 to produce a sync pulse. The control unit also may conveniently incorporate a suitable operator control panel 67 including a plurality of switches which may be selectively operated by the operator to modify the operation of the computer when the particular negative being printed departs from a predetermined standard. As indicated at 68 the computer and control unit and the densitometer sensing units 62, 63, 64 may conveniently receive operating potentials from the power supply 53.

FIGURE 2 shows in block diagram form the circuitry incorporated in the computing and control unit 29. Since, for the most part, each of the three exposure computing channels individual to the three primary color components is identical to the others, only one such channel will be described in detail. Where differences do exist these will be pointed out specifically. Thus in the red channel, the density information from sensing unit 62 may conveniently be applied as through a coupling capacitor 62′ to a cathode follower 70 where the average level of the output signal will be brought to a predetermined value. The signal appearing at the output of cathode follower 70 will be approximately in the form of a square wave the value of which during one-half cycle will correspond to the negative color density and during the other half cycle to the standard or reference density value. This signal is then applied as at 71 to a gate 72. Gate 72 is provided with two gate control inputs 73 and 74 each of which must be positive in order for the density signal to pass through the gate. As will be later described in detail, gate control input 74 will be at its positive potential throughout the entire exposure cycle. However, gate control input 73 is arranged to alternately vary between its high and low potential states in timed synchronism with the operation of the chopper disc 50, and therefore in predetermined phase relation with the square wave output from the sensing unit 62. The phasing of this gating control pulse is such that the gate 72 is open only during those periods when the output signal from cathode follower 70 corresponds to the reference density value. Since the average output level from follower 70 (which constitutes the axis of the square wave output) is fixed, the actual value of either peak will depend upon the peak-to-peak amplitude of the output signal which, in turn, will depend upon the relative values of light intensity derived from the negative and from the reference lamp 52. The value of either half of the square wave will therefore be a direct indication of the overall color density of the negative for that particular color. The value of the signal half derived from the reference lamp is herein utilized since, as described in the above-mentioned Reesen application, it will be substantially free of any fluctuations during any particular exposure cycle.

The density information passing through gate 72 is then applied to a cathode follower 75 which brings it to a predetermined D.C. level and is then passed onto a density signal storing unit or memory 76. As diagrammatically indicated in FIG. 2 such a memory unit may conveniently comprise a suitable diode 77 and storage capacitor 78 the latter charging to a value corresponding to the peak amplitude of the density signal applied thereto. The stored density signal is then appled by way of a suitable cathode follower 79 to a computing unit 80 where, as will be later explained, it is combined with similar density information derived from each of the other color channels and from the operator's classification unit to produce at its output 81 an output voltage which is directly proportional to the desired log exposure time for that particular color component.

In color printing it has been found that the proper exposure for any particular color component (red, green or blue) depends upon three densities:

(1) $D_n$, the neutral density of the negative.

(2) $D_{c_i}$, the color saturation of the negative for that particular color component, the letter $i$ standing for red, green, or blue, and (3) $D_I$, the illuminant or discriminating function, which indicates the color quality of the illumination used to expose the negative.

Where, as in a printer of the type illustrated, the exposure for any particular color is substantially proportional to the exposure time for that color, it is found that best results are obtained when the log exposure time (log $t_E$) for any color satisfies the following equation:

(Eq. 1) $\quad \text{Log } t_E = k_1 + k_2 D_N + k_3 D_{C_i} + k_4 D_I$ where $k_1$, $k_2$, $k_3$ and $k_4$ are constants.

As is known in the art the values $D_N$, $D_{C_i}$ and $D_I$ may each be expressed in terms of the overall red ($D_R$), green ($D_G$) and blue ($D_B$) densities of the negative as follows:

(Eq. 2) $\quad D_N = \frac{1}{3}(D_R + D_G + D_B)$
(Eq. 3$_R$) $\quad D_{C_R} = D_G + D_B - D_R$
(Eq. 3$_G$) $\quad D_{C_G} = D_R + D_B - D_G$
(Eq. 3$_B$) $\quad D_{C_B} = D_R + D_G - D_B$
(Eq. 4) $\quad D_I = D_B - D_R$ Substituting these values for the appropriate terms in Equation 1 and combining terms and constants, we obtain the following expressions for the log exposure time for each of the three primary color components.

(Eq. 5) $\quad \text{Log } t_{E_R} = C_R + C_1 D_R + C_2 D_G + C_3 D_B$
(Eq. 6) $\quad \text{Log } t_{E_G} = C_G + C_4 D_R + C_5 D_G + C_6 D_B$
(Eq. 7) $\quad \text{Log } t_{E_B} = C_B + C_7 D_R + C_8 D_G + C_9 D_B$ where $C_1$ to $C_9$, $C_R$, $C_G$ and $C_B$ are constants.

The computing units 80, 180, 280 solve the above three equations and produce at their outputs 81, D.C. voltages the values of which are directly proportional to and indicative of the log exposure times for the three components. There are many devices known by those skilled in the computing art which will readily perform this function and any such units could obviously be used. In the particular exposure control system illustrated, commercially available units manufactured and sold by George A. Philbrick Researchers, Inc., and known as the Philbrick Model K5–U Universal Linear Operators were employed. Each of these units provides four input terminals, into three of which are fed the $D_R$, $D_G$ and $D_B$ density signals derived from the associated densitometer memories, and into the fourth of which is fed a voltage derived from the operator's classification panel 67 and the value of which represents the term $C_R$, $C_G$ or $C_B$, as the case may be. These computing units are provided with circuitry for effectively multiplying each input voltage by a predetermined factor (eg. $C_1$), the value of which may be set by suitable controls 82, one associated with each input, and are further provided with circuitry whereby the resulting values may be added together algebraically. The exact values of the individual constants $C_R$, $C_1$, $C_2$ etc. will, of course, depend upon many factors such as the exact color composition of the light from the printing light source 10 and from the reference lamp 52, the characteristics of the sensitized strip, the amplification factors and other electrical characteristics of the various amplifiers, etc., but may be relatively easily determined for any particular printer and sensitized strip, either by trial and error or by known mathematical procedures. Once established for any particular printer and sensitized strip, these constants may be set into the computer and left untouched until some controlling factor is changed. Variations which are desired to compensate for under- or over-exposed negatives and/or for negatives having unusual or undesirable color balance, may be readily effected by the operator by actuating appropriate negative classification and/or color correction switches 140, 141 on the classification panel 67 to vary the voltages applied to the lower input terminals of the computers 80, 180, 280 and to thereby effectively vary the $C_R$, $C_G$ and/or $C_B$ terms in the above equations.

While many different arrangements for accomplishing this result could be utilized, the particular arrangement shown in the lower left hand corner of FIG. 2 has been found well suited to this use. Each negative classification switch 140 applies a predetermined voltage derived from a voltage divider network 142 to one side of the mixing resistors 143, 144 and 145 associated with all three color channels, while each color correction switch 141 applies a predetermined voltage to the other side of the mixing resistor 146, 147 or 148 associated with that particular color channel. The resulting voltages at the junctions of the three pairs of mixing resistors are then applied through their associated D.C. isolating amplifiers 149, 150, 151 to the lower input terminals of the respective computers to thereby determine the $C_R$, $C_G$ and $C_B$ values.

In summary, the computing unit 80 in the Red channel utilizes the four input voltages corresponding to the red, green and blue densities and the operator's classification of the negative to produce a negative output voltage at terminal 81 which is directly proportional to the desired log exposure time for the red color component. This voltage is applied to one input 83 of a voltage comparison unit or null detector 84 where it is compared with a voltage derived from a log timer 85 and which is applied to the other input 86 of the comparison unit.

As is explained below in more detail, timer 85 is placed in operation at the start of the printing cycle and produces, at its output, a negative voltage directly proportional to the log of the time elapsed since the start of the exposure. When the voltage from the timer equals that from the computer 80 for the Red channel, for example, a control pulse is produced at the output 85 of the null detector 84 and is applied by way of terminal 21 and connection 86′ (see FIG. 1) to the Close terminal 87 of the Red shutter actuator 42, causing the latter to move shutter 39 into the beam 33 whereby to terminate exposure so far as the red component is concerned. Similar operation meanwhile proceeds in the Green and Blue channels.

Control unit 20 further includes various control and programming circuitry, shown in block diagram form in FIG. 2, and which will now be described. This control circuitry may conveniently include a pair of bi-stable electronic flip-flop units 90 and 91 of conventional type. These units are well known in the control art and need no further description other than to point out that each is responsive to a control pulse or voltage applied to its "set" terminal 92 to set it into a first stable condition, which we will call "On," and in which On condition the upper output terminal 93 will be at a positive potential relative to ground, while the lower output terminal 94 will be at ground or lower potential. When a pulse is applied to the reset terminal 95, the flip-flop will be reset to its second, or "Off," stable condition, wherein the potentials at the output terminals 93 and 94 will be relatively reversed (94 will be positive and 93 will be ground or lower).

Flip-flops 90 and 91 are arranged to be set to their On condition by a control voltage applied over line 96. While, in a practical printer, this control voltage would ordinarily be derived from rather complicated programming circuitry, to avoid unnecessary confusion we have merely shown a Start button 97 on control panel 67 for initiating a printing cycle. As indicated, when the Start button 97 is pressed (the appropriate negative classification buttons already having been actuated) a pulse is applied by connections 98—104 (see FIG. 1) to the shutter Open terminals of each of the three shutter actuators 42, 43 and 44, so that the negative at station 12 will be properly illuminated with "white" light as previously described. As soon as all three shutters 39, 40 and 41 are fully open, suitable interlock switches 42′, 43′, 44′ (FIG. 2) actuated thereby (by mechanical connections, not shown) will be closed to apply triggering voltage over circuit 96 to flip-flops 90 and 91, setting them to their On condition.

As previously described, magnetic sensing element 66 produces regular sync pulses in predetermined relationship with the rotation of the chopper disc 50 of the densitometer. These pulses are applied to a suitable amplifier 106 and thence to a conventional pulse gate 107. The gating control input 108 of gate 107 is connected to the output terminal 93 of flip-flop 90 so that whenever the latter is On gate 107 will be operative to pass the sync pulses from amplifier 106 to a gating pulse generator 109. Pulse generator 109 may conveniently be a conventional mono-stable multivibrator or "one-shot" and is adapted to produce, in response to each sync pulse, the previously mentioned positive-going gating pulses which are applied through a cathode follower 110 to the gate control input terminals 73 of each of the gates 72, 172, 272 in the color density channels. As previously described, this gating pulse is of such timing and has such duration that it renders gate 72 operative only during the period when the densitometer sensing units are receiving light from the reference lamp. Preferably the gating pulse will be slightly shorter than this period so that undesired transients that might develop at the beginning and end of the period will be blocked and therefore prevented from giving false density information.

Flip flop 91, when turned On, likewise applies the previously mentioned positive gating voltage by way of cathode follower 111 to the other gate control input terminal 74 of each gate 72, 172, 272 in the color density channels. It also produces a positive voltage at the memory cancel terminal 112 of each of the memory units 76, 176, 276 so that the latter will be rendered operative to store the density information as previously described.

Log timer 85 is preferably of the type shown and described in a companion application Serial No. 98,397, filed March 27, 1961, in the name of Murray C. Goddard. However, any timer capable of producing an output voltage which varies linearly as the logarithm of the elapsed time over a period of up to about ten seconds would be adequate. As is explained more fully in the above identified Goddard application the particular timer illustrated is started and later reset in response to the voltage applied to a control terminal 113, the arrangement being such that when the voltage is relatively high the timer will be in its Off or Reset condition and, when the voltage is low, the timer will be in operation. This control voltage is derived from output terminal 94 of flip-flop 91 and is applied by way of a suitable cathode follower 114. When flip-flop 91 is Off, the potential at output 94 (and therefore at terminal 113 of the timer 85) will be positive placing the timer in its reset condition. Under these conditions the voltage at the output terminal 115 of the timer 85 will be at a predetermined low positive value. When flip-flop 91 is turned On at the beginning of a printing cycle, the voltage applied to input terminal 113 abruptly drops to a low value, which causes the timer to begin operation and to produce, at its output terminal 115, a negative-going voltage which varies logarithmically with the elapsed time.

In order to insure that the log timer will be stable before actual printing begins, it is permitted to operate for a fraction of a second until its output voltage reaches a predetermined reference value, at which time it initiates opening of the master shutter 16 to start the actual printing exposure. The instant when this occurs is considered as zero exposure time ($t_0$). The difference between the timer output voltage at any time and the reference voltage will therefore be directly proportional to the logarithm of the time which has elapsed since the zero exposure time ($t_0$) for that particular printing cycle. To obtain this result the output from the log timer 85 is applied as at 116 to one input of a voltage comparison unit or null detector 117, to the other input 118 of which is applied the reference voltage. When the voltage from the timer reaches the same level as the reference voltage, a predetermined voltage is producd at the output 119 of the null detector and is applied via terminal 120 and line 121 to the shutter Open terminal of shutter actuator 17, causing the latter to move shutter 16 to its open position to start the actual exposure cycle.

Any type of known voltage comparison unit may be utilized as the null detector 117. For example, this unit may conveniently be constituted by another commercially available Philbrick analog computer module known as the Philbrick Model K2–W Operational Amplifier. This unit is a D.C. amplifier having differential inputs to which the two voltages to be compared are applied. With such units, as the value of one input voltage approaches close to and then passes through the value of the other, there will be produced a sudden change in the output voltage, from a first predetermined value, through zero, to a second predetermined value of opposite polarity. Complete details of this unit are readily available from the manufacturer.

The previously mentioned voltage comparison units or null detector 84, 184, 284 in the color control channels may likewise conveniently utilize these same commercially available units. In fact for extremely precise results (as are highly desirable in a system such as that under consideration), each comparison unit may conveniently be made up of two such differential operational amplifier units 123, 124 connected in cascade as clearly indicated in FIG. 2. As previously described the first such differential amplifier 123 will produce an output voltage which very rapidly approaches zero or ground potential as the voltages applied to the inputs 83 and 86 approach close to one another. The value of this output voltage is meanwhile compared directly to ground potential by the second unit 124 so that the predetermined change in output or control signal will be obtained at its output 85 at the precise instant when the two input signals (desired log exposure time and actual log exposure time) for that channel exactly coincide in value.

When, as previously described, the shutter controlling any one of the color components in the printing light is closed to terminate the exposure for that particular color component, that same component is also removed from teh light reaching the color densitometers. Therefore, the densitometer which normally senses this particular component will thereafter produce a completely false indication. In order to prevent this false density information from affecting adversely the operation of the computers in the other two color channels for the remainder of their exposure periods, an arrangement is provided to render all of the densitometers ineffective upon the closing of the first color control shutter to be actuated and to therefore allow the computers to operate solely on the basis of the density information previously stored in the memories 76, 176, 276. To this end, the output control signals from the null detectors 84, 184, and 284 are fed to a conventional logical OR gate 130. Such OR gates are well known in the computing and control art and, as is well known, have the properties of passing a signal applied to any one of their input terminals through to the output thereof while at the same time effectively isolating the inputs from one another. Thus, when the exposure time for the first color component has been completed, the output control signal from the corresponding null detector will pass through OR gate 130 to its output 131 and thence to reset terminal 95 of flip-flop 90, causing the latter to reset to its Off condition. This will cause the voltage at the output terminal 93 of flip-flop 90 to drop to a low value thereby rendering gate 107 incapable of passing the synchronized triggering pulses from amplifier 106 to pulse generator 109. Pulse generator 109 will therefore cease its operation and the voltage applied to the gate control terminals 73 of the transmission gates 72, 172 and 272 will remain at its low or gate-blocking level. Thus these gates 72, 172, 272 will be closed and will prevent further density information from passing to their associated memory or storage units 76, 176, 276. However, these storage units will continue to supply the previously stored density signals to the computers 80, 180 and 280 so that the latter will continue to operate in their normal manner.

When the last of the three color control shutters has been actuated, it is desired to close the main control shutter 16 and to reset the log timer 85 and the density storage units 76, 176, 276, to prepare them for another printing cycle. To obtain this result the outputs from the three color channel null detectors 84, 184 and 284 are also applied to a conventional logical AND gate 132. As is well known in the computing art such gates will produce an output pulse or signal only when the voltages applied to their input terminals are all at a predetermined level. This condition obtains only when the output voltages from all three null detectors have shifted to the value indicating the end of the exposure period for the corresponding color components. Thus, when the last of the null detectors signals the end of the printing cycle, the AND gate 132 will pass a control signal by way of lead 133 and a suitable pulse delay amplifier 134 to the reset terminal 95 of flip-flop 91, causing the latter to reset to its Off condition. Delay amplifier 134 may be of conventional design, such as a monostable or "one shot" multivibrator capable of producing a slight time delay of a few milliseconds to prevent a possible oscillating action and thus to insure proper sequence of operation. When flip-flop 91 is turned Off, the voltage at its output terminal 93 drops to a low level thereby removing the gating potential from gate control terminals 74 of gates 72, 172, 272 and lowering the potential at the reset terminals 112 of the memories 76, 176, 276 so that their storage capacitors 78 may be discharged through their internal "dump" diodes 138 to effectively remove the stored density information therefrom. At the same time, the output voltage at terminal 94 of flip-flop 91 will rise to a level sufficient to cause log timer 85 to be reset. The output from terminal 94 will also be applied, by way of terminal 135 and connection 136, to the Close terminal 137 of shutter actuator 17, thereby causing master shutter 16 to be moved to its closed position. Thus the system will be placed in condition for a new printing cycle.

It is not beleived necessary to again describe in detail the specific operation of the above described control system since the operation has been already described in conjunction with the discussion of the circuitry. Briefly, after the various lamps have been lit and the densitometer motor started by closing switch 47, and the operator has examined the negative to be printed, he actuates the appropriate negative classification switch and (if required) whichever color-correction switch he deems appropriate. He then presses the start button 97 which causes opening of the three control shutters 39, 40 and 41 in the light source thereby rendering the source effective to illuminate the negative at the printing station with "white" light. As soon as these three shutters are opened interlock switches 42, 43, 44 close to energize the programming control flip-flops 90 and 91. These, in turn, render the synchronous gating circuit, the density signal gates 72, 172, 272, and the density memory units operative, placing the latter in condition for storing the density information derived from the densitometer sensing units. Flip-flop 91 also causes the log timer to begin its operation and, as soon as the timer output voltage reaches the predetermined reference (or $t_0$) value, the master shutter 16 is opened to start the actual printing exposure for all three color components. The voltages stored in the memories and which are respectively indicative of the red, green and blue overall or integrated densities present in the negative are applied together with the appropriate voltages from the operator's negative classification panel, to the computers 80, 180, 280 which, as previously described, will produce at their output terminals 81 voltages directly proportional to the logarithm of the desired exposure time for each of the color components. Each of these desired exposure voltages is continuously compared by voltage comparison units 84, 184, 284 with the output voltage from the log timer 85 and as the latter reaches the desired exposure voltage from the computer for any one channel, an output signal is produced by the corresponding comparison unit causing the shutter 39, 40 or 41 controlling that particular color component to close and thereby terminating the exposure for that color. At the same time this output signal from the comparison unit will pass through OR gate 130 to reset flip-flop 90 which, in turn, causes gate 107 to prevent the further generation of synchronous gating pulses by pulse generator 109. Thus gates 72, 172, and 272 will be rendered incapable of passing any further density information to the associated memories. However, the computers 80, 180, 280 will continue to operate on the basis of the previously stored density information standing in the memories at this time. When the proper exposure period for the last color exposure is reached AND gate 132 will become effective to apply a reset signal to flip-flop 91. As previously described this will result in removal of gating voltage from the terminal 74 of gates 72, 172, 272, the "dumping" of the stored density information from the three memory units, reset of the log timer 85, and closing of the master shutter 16. Thus the apparatus will be in readiness for a new cycle of operation.

With the system disclosed, color density information is continually being supplied to the memories up until the time when the first color component exposure is terminated. Thus any inaccuracies which might tend to occur because of leakage of the storage capacitors in the memories will be held to a minimum.

While in the above description references have been made to certain specific components, it will be obvious to those skilled in the art that equivalent units may readily be substituted therefor without adversely affecting the operation of the system. The invention is likewise obviously applicable to color printers of many different constructions and the diagrammatic showing of the printer in FIG. 1 is merely for purposes of illustration. For example, while we show three separate light sources, each with its own filter and controlling shutter, for producing the desired "white" light at the negative station it is quite obvious that a single "white" light source with appropriate color subtracting filters could be used instead to individually control the three color exposures. Similarly, other known types of color densitometers could be utilized. The same is generally true of any of the other components described and it is not intended that the scope of applicants' patent protection should be unduly limited merely because they have illustrated particular components. While, in the description, we have referred to the specific polarity of the control and signal voltages at various points in the system, it is obvious that signals of opposite polarity could likewise be used with but minor modifications of the apparatus and that such modification would be obvious to those skilled in the electronic control art. Obviously, many other changes can be made without departing from the spirit and scope of the invention as defined by the appended claims.

We claim:

1. An exposure control system for a photographic color printer of the type having a plurality of individually controllable printing light sources each of a different color, and means for directing light from said sources through a negative to be printed and toward a printing station, said system comprising a multi-channel exposure computer, one channel corresponding to each of said colors, and each channel comprising densitometer means controlled by and responsive to light of the associated color passing through said negative for producing an output signal corresponding to the average color density of the negative for that particular color, storage means for storing said color density signal, a signal mixer conjointly responsive to the color density signal stored in said storing means for that particular channel and those color density signals stored in the storage means for the other channels to produce at its output a voltage having a predetermined relationship to, and indicative of, the desired log exposure for that particular color; programming means for conjointly rendering said light sources operative to initiate an exposure cycle, a log timer common to all said channels and responsive to such actuation of said programming means for producing an output voltage which varies from a predetermined initial value as the logarithm of the elapsed time from the initiation of said exposure, and control means, one associated with each of said light sources, and each being conjointly responsive to the outputs from said log timer and the signal mixer for its associated color channel, for terminating exposure by the corresponding light source when said mixer and log-timer outputs reach a predetermined relationship.

2. An exposure control system as in claim 1 further comprising means responsive to actuation of any of said control means for rendering all of said storage means non-responsive to further output signals from their associated densitometer means for the remainder of said exposure cycle.

3. An exposure control system as in claim 2 further comprising means conjointly responsive to and controlled by all of said control means for effectively cancelling said stored density signals from all of said storage means.

4. An exposure control system as in claim 1 further comprising means conjointly responsive to and controlled by all of said control means for effectively cancelling said stored density signals from all of said storage means.

5. An exposure control system for a photographic color printer of the type having an original station, a printing station, a plurality of individually controllable printing light sources, each of a different color, and optical means for directing light from said sources through said original station to said printing station, said system comprising a log timer, means rendering operative said log timer and said light sources to initiate an exposure cycle, said log timer producing at its output a voltage which varies from a predetermined reference value as the logarithm of the time elapsed since the start of said exposure cycle, color densitometer means responsive to the light passing through said original station for producing a plurality of color density signals indicative of the overall color density of an original positioned at said original station for each of said colors, signal mixing means conjointly responsive to and controlled by all of said color density signals for producing a plurality of output voltages one corresponding to the desired log exposure for each of said colors, and means for individually comparing each of said last-mentioned output voltages with the output voltage from said log timer and responsive to such voltages to produce individual control signals, one for each color, when the log timer voltage reaches a predetermined value relative to the desired log exposure voltage for that particular color, and means responsive to each of said control signals for rendering the corresponding light source ineffective.

6. An exposure control system for a photographic color printer of the type having a negative station, a printing station, illuminating means including a plurality of individually controllable light sources, each of a different color, and means for directing light from said sources through said negative station to said printing station and a shutter positioned between said stations and operable between closed and open positions, said system comprising a timer, start control means for rendering said light sources operative to pass light through a negative located at said negative station and for starting said timer, means controlled by said timer for opening said shutter to start a printing exposure cycle, said timer being operative to produce an output voltage which varies from a predetermined reference level at the initiation of said exposure cycle as the logarithm of the time elapsed since such initiation, means including a color densitometer responsive to light passing through said negative and an exposure computer controlled by said densitometer for producing a plurality of output voltages, one corresponding to the desired log exposure for each of said colors, a plurality of control means, one associated with each of said light sources, and responsive to the output from said timer and to the individual outputs from said computer for rendering each light source ineffective when the timer output voltage reaches a predetermined value relative to the computer output voltage for that particular color, and means responsive to operation of the last of said control means for closing said shutter and terminating operation of said timer.

7. An exposure control system as in claim 6 including density signal storage units, one for each color, operatively interposed between said densitometer and said computer, means controlled by said start control means for rendering said storage units responsive to said densitometer whereby each storage unit provides at its output a signal corresponding to the overall color density of said negative for that particular color, said computer being conjointly responsive to and controlled by the output signals from said storage units, and means controlled by all of said control means and responsive to operation of the first of said control means to be operated to render all of said storage units insensitive to further output from said densitometer for the remainder of said cycle.

8. An exposure control system as in claim 7 comprising means responsive to operation of the last of said control means for cancelling the stored density signals from said storage units.

9. An exposure control system for a photographic color printer of the type having a light source and start control means for rendering said light source effective to illuminate a negative to be printed and to produce, at a printing station, a light image of said negative to initiate a printing exposure cycle, the light initally emitted by said source including a plurality of major color components, said system including color densitometer means responsive to light from said source as modified by said negative for producing individual color density signals, one corresponding to each of said color components and each having a value indicative of the integrated color density of said negative for that particular color, density signal storing means adapted to receive and individually store said color density signals, exposure control means, one for each color component, and each conjointly responsive to all of said stored color density signals and effective upon the exposure for that particular color component attaining a predetermined value relative to said individual color density signals, to substantially eliminate that color component from the light reaching said printing station and said densitometer means from said source, and means responsive to such exposure-terminating operation of any one of said exposure control means for rendering said storing means non-responsive to further signals from said densitometer means for the remainder of said exposure cycle.

10. An exposure control system as in claim 9 wherein said start control means includes a light-controlling shutter arranged, when closed, to prevent light from said source reaching said printing station and adapted to be opened to initiate the exposure cycle, and means operative in response to exposure-terminating operation of all of said exposure control means to close said shutter.

11. An exposure control system as in claim 10 wherein said color densitometer means are so located as to respond to the light from said source as modified by said negative regardless of the condition of said shutter.

12. An exposure control system as in claim 11 wherein said start control means is arranged to render said light source effective to illuminate said negative slightly before said shutter is opened to initiate a printing exposure cycle.

13. An exposure control system for a photographic color printer of the type having a light source for illuminating a negative to be printed, means for producing an image of said illuminated negative at a printing station, and start control means for rendering said light source effective to initiate a printing exposure by light derived from said source and modified by said negative, the light from said source initially including a plurality of primary color components and said light source including color control means for individually controlling each of said color components, said system comprising color densitometer means responsive to light from said source as modified by said negative for producing individual color density signals, one corresponding to each of said color components and indicative of the integrated color density of said negative for that particular color component, density signal storing means, one for each color, adapted to receive and individually store said density signals from said densitometer means, exposure control means responsive to and conjointly controlled by the stored density signals for causing actuation of said color control means to substantially eliminate, individually, each of said color components from said printing light when the exposure for that particular color reaches a predetermined relationship to said stored density signals, and means responsive to the first such operation of said exposure control means in any printing cycle to render said storing means non-responsive to further signals from said densitometer means for the remainder of said cycle.

References Cited in the file of this patent

UNITED STATES PATENTS 2,565,399    Simmon    Aug. 21, 1951
2,691,917    Curry    Oct. 19, 1954

OTHER REFERENCES

"A High Speed Color Printer," Gundelfinger et al., Photographic Science and Engineering, May–June 1960, vol. 4, issue No. 3, pages 141–150.